Figure 3:
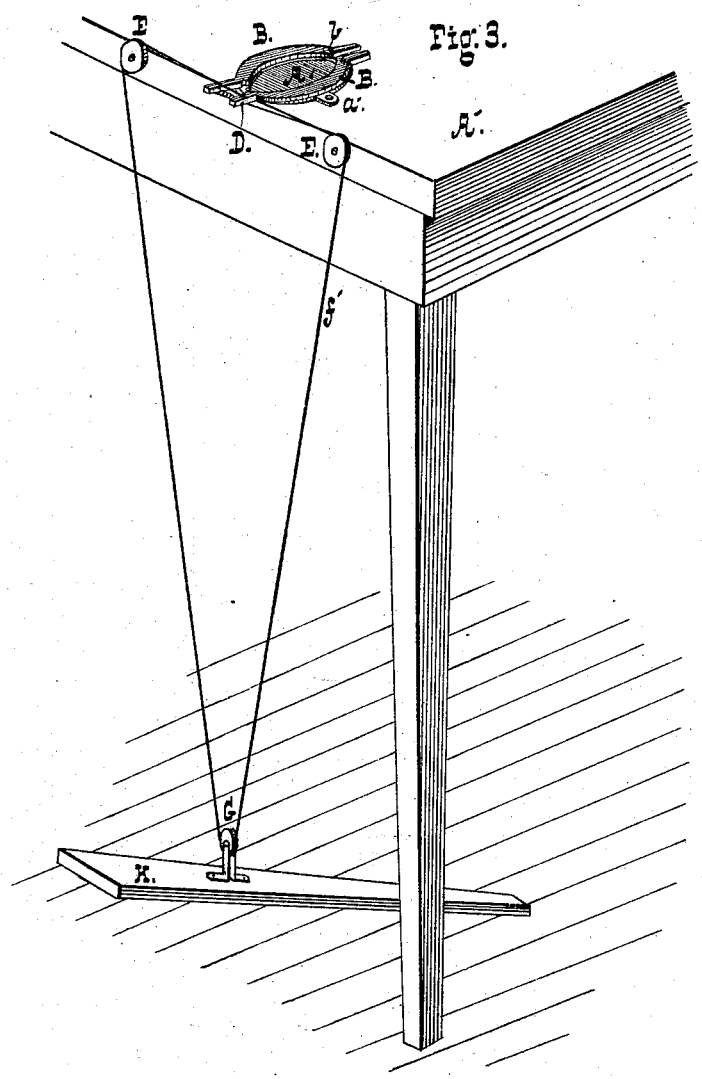

(No Model.) 2 Sheets—Sheet 1.
W. J. CLARK.
Can Heading Machine.
No. 238,351. Patented March 1, 1881.
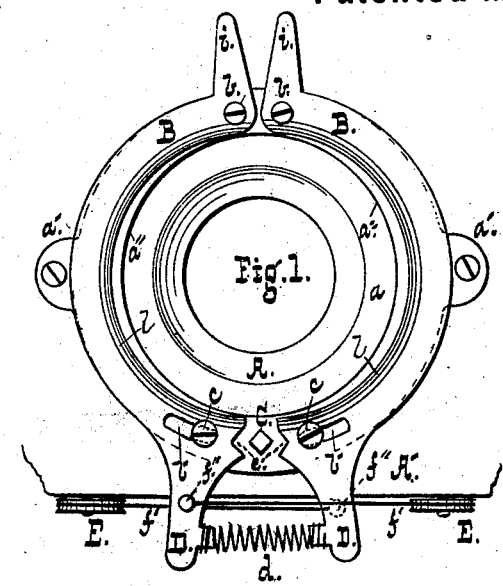
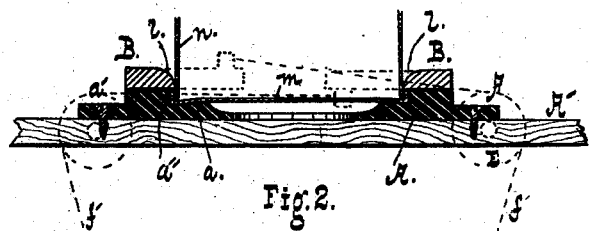
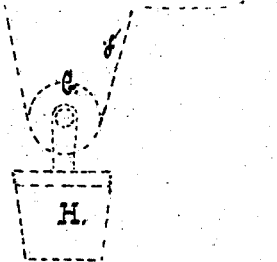
Witnesses,
W. A. Bertram
[signature]
Inventor,
Wm. J. Clark.
by
[signature]
Attorney.

(No Model.) 2 Sheets—Sheet 2.

W. J. CLARK.
Can Heading Machine.

No. 238,351. Patented March 1, 1881.

Witnesses,
W. A. Bertram
C. H. Dight

Inventor,
Wm. J. Clark
by R. S. Williams
Attorney.

UNITED STATES PATENT OFFICE.

WILLIAM J. CLARK, OF BALTIMORE, MARYLAND, ASSIGNOR TO CHARLES E. HULL AND JONATHAN Q. RAND, OF SAME PLACE.

CAN-HEADING MACHINE.

SPECIFICATION forming part of Letters Patent No. 238,351, dated March 1, 1881.

Application filed January 7, 1881. (No model.)

*To all whom it may concern:*

Be it known that I, WILLIAM J. CLARK, of Baltimore, State of Maryland, have invented certain new and useful Improvements in Can-Heading Machines; and I hereby declare the same to be fully, clearly, and exactly described as follows, reference being had to the accompanying drawings, in which—

Figure 1 is a top plan of the machine. Fig. 2 is a central vertical transverse sectional view. Fig. 3 is a perspective view of the device.

My invention has for its object to provide a machine for rapidly and expeditiously applying heads to tin cans or similar vessels, such as paper boxes, having flanged heads.

The tin can almost universally used for containing hermetically-sealed provisions is cylindrical in cross-section, and is provided with heads having flanges which inclose the ends of the cylindrical body. It is a desideratum, or rather a practical necessity, in making these cans that the heads shall fit closely over the cylindrical body, so that when placed on the ends of the same the can may be carried to the soldering-machine without any danger of the heads falling off the body. A close fit is, moreover, desirable on account of the economy of solder and convenience of soldering which it secures. The closer the fit, in a word, the better in these respects; but a close fit vastly increases the difficulty of placing the head upon the can. It is my object to obviate this difficulty by providing a machine combining a die for holding the head with a tapering expansible gage for truing the wall-blank or can-body to the exact shape of the head, be it circular, oval, square, or polygonal, and guiding it to a position within the head-flange.

Referring now to the accompanying drawings, A' is a suitable table or support, to which is secured the die A by screws passing through lugs $a'$, or in any other convenient way. The die is countersunk to receive the can-head $m$, which falls within the rim $a''$, and rests on the ledge $a$, as shown in Fig. 2. The countersink is very slightly deeper than the head-flange, and also very slightly larger in diameter than the same.

B B are the two parts of the gaging and guiding ring, and are pivoted to the die at $b$ $b$. They are beveled on the inner edge, as shown at $l$, and the interior diameter of the ring formed by the two parts when closed together is very slightly less than the internal diameter of the can-head within the flange. (See Fig. 2.) On the ends of the parts B B are arms D, that are normally thrust apart by an interposed spring, $d$, to the extent admitted of by the slots $b'$, through which pass screws $c$.

C is a square lug on the die A, against which V-shaped recesses $e$ in the ends of the parts B fit when the ring is closed.

E E are pulleys mounted on the support A', over which a cord, $f'$, leads from the lugs $f'''$ on the arms D. The cord passes over a pulley, G, attached to a treadle, H.

In operation, a can-head, being stamped up as usual, is placed in the die and the treadle is depressed, causing the half-rings B to close against the lug C and over the flange of the head. It will be understood that the extreme inner edge of the ring very slightly overlaps the flange all around. The can-body is then brought down inside the ring, the treadle being held depressed, and is forced down until it abuts against the head in the lower die. In this act the edge of the body is trued up to the exact shape of the can-head, and is slightly compressed, so that it enters the space within the flange without any difficulty. The treadle being now released, the parts B B open, and the can-body springs out against the flange. The body is then lifted, carrying the head with it, and the joint is rosined and soldered as usual.

It is clear that the die A and parts B may be of any desired cross-section. I have shown them as circular, as that is the ordinary shape of cans in cross-section.

It is clear that my invention is equally applicable to the heading of cans whose heads come inside the wall-blank, the ends of the latter being finally crimped over the edges of the heads. For this purpose the head is applied to the can, instead of vice versa, the lower die being made deep enough to hold the can-body, and the upper ring being made to receive the head and guide it into place within the body.

I have shown and described a simple system of pulleys, cord, and treadle to close the gage and guide B B; but any other means may be used—such, for instance, as a wedge driven down between the arms $i$ by a lever or treadle. Indeed, the device may be operated wholly by hand, the user squeezing the arms D together with one hand, while he inserts first the head and then the can-body with the other.

I claim—

1. In a can-heading machine, a die for receiving the heads, and a gaging and guiding device consisting of two pivoted parts arranged to be brought together over the die, as described.

2. In a can-heading machine, a die having a countersunk portion arranged to receive the can-head, and a pair of tapering guides and gages pivoted over the die and adapted to compress and true the can-body as it is pressed between them into the head, as set forth.

3. In combination with the countersunk die, the pivoted guide and gages, and mechanism for thrusting them apart and drawing them together, substantially as set forth.

4. In combination with the countersunk die A, having rim $a''$, the pivoted pieces B, having slots $b'$ and screws $c$, the lug C, and mechanism, substantially as described, for drawing the said pieces together.

5. In combination with the countersunk die A, the pieces B, pivoted thereto and having arms D and spring $d$, and the treadle, cord, and pulleys, as set forth.

WILLIAM J. CLARK.

Witnesses:
 R. D. WILLIAMS,
 J. C. GITTINGER.